(12) United States Patent
Kim

(10) Patent No.: US 12,109,999 B2
(45) Date of Patent: Oct. 8, 2024

(54) BRAKE APPARATUS FOR VEHICLE

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 194 days.

(21) Appl. No.: 18/073,987

(22) Filed: Dec. 2, 2022

(65) Prior Publication Data

US 2023/0391303 A1 Dec. 7, 2023

(30) Foreign Application Priority Data

Jun. 2, 2022 (KR) ........................ 10-2022-0067342

(51) Int. Cl.
*B60T 8/88* (2006.01)
*B60T 8/92* (2006.01)
*B60T 13/58* (2006.01)
*B60T 13/74* (2006.01)

(52) U.S. Cl.
CPC ............... *B60T 8/92* (2013.01); *B60T 13/58* (2013.01); *B60T 13/74* (2013.01); *B60T 2220/04* (2013.01); *B60T 2240/00* (2013.01); *B60T 2250/04* (2013.01); *B60T 2270/402* (2013.01); *B60T 2270/404* (2013.01); *B60T 2270/413* (2013.01); *B60T 2270/414* (2013.01); *B60T 2270/82* (2013.01)

(58) Field of Classification Search
CPC ... B60T 8/885; B60T 8/92; B60T 8/94; B60T 8/96; B60T 13/58; B60T 13/74; B60T 2220/04; B60T 2250/04; B60T 2270/402; B60T 2270/403; B60T 2270/404; B60T 2270/413; B60T 2270/82
USPC .......................................... 701/70, 76, 78, 92
See application file for complete search history.

(56) References Cited

U.S. PATENT DOCUMENTS

| 2008/0021623 | A1* | 1/2008 | Frey ........................ | B60T 8/321 |
| | | | | 701/70 |
| 2022/0227341 | A1* | 7/2022 | Shimazaki ............... | B60T 8/94 |
| 2023/0211673 | A1* | 7/2023 | Travagliati .......... | B60L 15/2036 |
| | | | | 701/22 |

* cited by examiner

*Primary Examiner* — Erick R Solis
(74) *Attorney, Agent, or Firm* — NovoTechIP International PLLC

(57) ABSTRACT

A brake system for a vehicle is provided, the brake system including: a main control unit configured to control main braking in response to a pedal signal, control parking braking in response to an EPB signal, and control a plurality of hydraulic brake units disposed at a front wheel unit of the vehicle; a first rear wheel unit configured to receive the pedal signal using a first control unit and control a first rear wheel; a second rear wheel unit configured to receive the EPB signal using a second control unit and control a second rear wheel; and a communication network configured to transmit and receive a braking signal between the main control unit, the first rear wheel unit and the second rear wheel unit.

16 Claims, 5 Drawing Sheets

BRAKE APPARATUS FOR VEHICLE

CROSS-REFERENCE TO RELATED APPLICATIONS

The present application is based on and claims the benefit of priority to Korean Patent Application Number 10-2022-0067342, filed on Jun. 2, 2022 in the Korean Intellectual Property Office, the entire disclosure of which is incorporated herein by reference.

TECHNICAL FIELD

The present disclosure relates to a brake for a vehicle.

BACKGROUND

The description in this section merely provides background information related to the present disclosure and does not necessarily constitute the related art.

An Electro-Mechanical Brake (EMB) is a device, on which a caliper, drum, and motor-driven actuator are mounted, that generates braking force without using hydraulic pressure. Recently, a hybrid EMB system that is a mixture of an electro-hydraulic brake (EHB) and an EMB has been developed. In a vehicle with the hybrid EMB system, the front wheels may be braked using the EHB, and the rear wheels may be braked using the EMB.

The EMB system may independently brake at all times using each axle connected to front wheel units and rear wheel units of a vehicle. Since the EMB system may always independently brake the axle, this system may be applied to an autonomous driving system to implement electrical redundancy between the front and rear wheel units of the vehicle.

The hybrid EMB system uses the main Electronic Control Unit (ECU) to control an electric booster of the front wheel units of the vehicle and transfers a brake command to a rear wheel unit EMB. When the main ECU fails, the redundancy ECU may transfer a brake command to a rear wheel unit EMB.

The EMB has a simple structure, high spatial utilization, and does not use hydraulic pressure, and thus there are eco-friendly benefits. However, the EMB has a complicated configuration and a relatively high manufacturing cost.

SUMMARY

According to an embodiment of the present disclosure, a brake for a vehicle is provided, the brake comprising: a main control unit configured to control main braking in response to a pedal signal, control parking braking in response to an EPB signal, and control a plurality of hydraulic brake units disposed at a front wheel unit of the vehicle; a first rear wheel unit configured to receive the pedal signal using a first control unit and control a first rear wheel; a second rear wheel unit configured to receive the EPB signal using a second control unit and control a second rear wheel; and a communication network configured to transmit and receive a braking signal between the main control unit, the first rear wheel unit and the second rear wheel unit.

According to an embodiment of the present disclosure, a method for controlling a brake for a vehicle is provided, the method comprising: receiving a braking request signal of a driver; determining whether a main control unit has failed; determining whether the braking request signal is a pedal signal when the main control unit is determined to have failed; receiving, by a first control unit, the pedal signal and deciding a main braking command when the braking request signal is determined as the pedal signal; requesting, by the first control unit, a second rear wheel unit to control main braking according to the pedal signal; performing the main braking by a first rear wheel unit and the second rear wheel unit; receiving an EPB signal received by a second control unit and deciding a parking braking command when the braking request signal is determined not to be the pedal signal, but the EPB signal; requesting, by the second control unit, the first rear wheel unit to control parking braking according to the EPB signal; and performing the parking braking by the first rear wheel unit and the second rear wheel unit.

DETAILED DESCRIPTION

Figure 1:
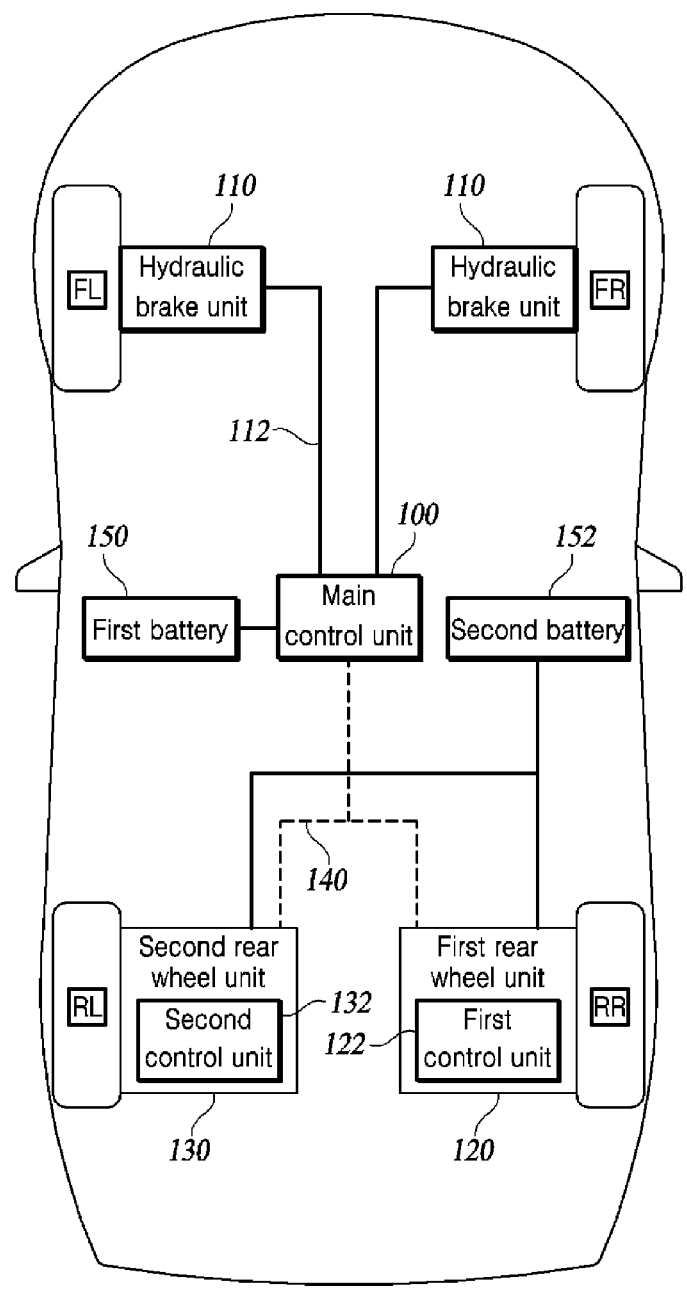
FIG. 1 is a view illustrating the configuration of a brake for a vehicle according to an embodiment of the present disclosure.

According to an embodiment of the present disclosure, a plurality of rear wheel EMB wheel control units perform functions of a redundancy ECU, thereby simplifying an EMB system configuration and reducing manufacturing costs.

According to an embodiment of the present disclosure, a redundancy system for estimating a vehicle speed may be implemented during Anti-lock Braking System (ABS) control by connecting an assistant wheel speed sensor measuring wheel speeds of front wheels and rear wheels to a main control unit and a first rear wheel unit.

The aspects of the present disclosure are not limited to those mentioned above, and other aspects not mentioned herein will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a view illustrating the configuration of a brake for a vehicle according to an embodiment of the present disclosure.

Referring to FIG. 1, the brake or brake system for the vehicle according to an embodiment of the present disclosure includes all or some of a main control unit 100, a hydraulic brake unit 110, a hydraulic line 112, a first rear wheel unit 120, a first control unit 122, a second rear wheel unit 130, a second control unit 132, a communication network 140, a first battery 150, and a second battery 152.

The main control unit 100 may include an Electronic Control Unit (ECU) and a front wheel hydraulic actuator (not shown). The ECU may calculate the received signal to decide whether to brake the vehicle and transfer the same to the front wheel hydraulic actuator to control the hydraulic brake unit 110.

The main control unit 100 may receive an external signal, a braking signal, a steering signal, and the like of the vehicle, and control driving and braking by using at least one of the received signals.

The main control unit 100 may receive a pedal signal and perform a main braking control using the pedal signal. The pedal signal is a signal generated by a driver applying force to a pedal and may be a signal for requesting braking of the vehicle through a pedal depression force.

The main control unit 100 may receive an Electronic Parking Brake (EPB) signal and perform parking braking of the vehicle using the EPB signal. The EPB signal may be a signal of a driver operating an EPB button to request parking braking of the vehicle when the vehicle is being parked. The EPB signal may be configured as four pulse waveforms. Two of the four EPB signals may be received by the main control unit 100, and the remaining two EPB signals may be received by the second control unit 132. The main control unit 100 and the second control unit 132 may implement redundancy for the EPB signal using the communication network 140.

The main control unit 100 and the second control unit 132 may share the received EPB signal using the communication network 140. When the main control unit 100 or the second control unit 132 has a failure, the redundancy for a parking braking signal may be implemented by performing parking braking of the vehicle using the two EPB signals.

When the first control unit 122 fails, the main control unit 100 may perform a main braking control using the second rear wheel unit 130 and the hydraulic brake unit 110.

The main control unit 100 may perform parking braking by transferring a parking braking command to the second rear wheel unit 130 using the communication network 140 and controlling the second rear wheel unit 130.

When the first control unit 122 fails, the second control unit 132 may control the parking braking by receiving the EPB signal of the vehicle and deciding the parking braking command.

When the second control unit 132 fails, the main control unit 100 performs a main braking control using the first rear wheel unit 120 and the hydraulic brake unit 110, while the main controller 100 may perform parking braking by transferring a parking braking command to the first rear wheel unit 120 using the communication network 140 to control the first rear wheel unit 120.

When braking of the first rear wheel unit 120 and the second rear wheel unit 130 is impossible due to an abnormality in the communication network 140, the main control unit 100 may use an assistant rear wheel speed sensor 207 to receive the wheel speed of the second rear wheel. The main control unit 100 may calculate a plurality of front wheel speeds and second rear wheel speeds measured using a front wheel speed sensor, estimate a vehicle speed, and assist in braking such as Anti-lock Braking System (ABS).

The plurality of hydraulic brake units 110 may receive a braking command decided by the main control unit 100 using the hydraulic line 112 and may be implemented as an Electro-Hydraulic Brake (EHB) system.

The plurality of hydraulic brake units 110 are located on one side of a vehicle and are illustrated to perform braking of the vehicle. However, this is merely to explain an embodiment of the present disclosure, and the plurality of hydraulic brake units 110 are not limited to any one location of one side and the other side of the vehicle.

The first rear wheel unit 120 and the second rear wheel unit 130 may be configured as a rear wheel unit EMB (Electro-Mechanical Brake) including a motor (not shown), a gear (not shown), a caliper (not shown), and a friction material (not shown).

The first rear wheel unit 120 may be configured as an EMB of a first rear wheel among the rear wheel units of a vehicle and may include the first control unit 122.

The first control unit 122 may be configured as a wheel control unit (BWCU: Brake-by-Wire Control Unit) of a first rear wheel, and may receive a pedal signal to control the main braking of a vehicle.

When the main braking control of a vehicle is impossible due to the failure of the main control unit 100, the first control unit 122 receives the pedal signal to decide the main braking, and transfers the decided main braking command to the second rear wheel unit 130. Braking may be controlled by receiving a main braking signal from the first rear wheel unit 120 and the second rear wheel unit 130 and generating braking force.

The second rear wheel unit 130 may be configured as an EMB of a second rear wheel among the rear wheel units of a vehicle, and may include the second control unit 132.

The second control unit 132 may be configured as a wheel control unit (BWCU: Brake-by-Wire Control Unit) of a second rear wheel and may receive the EPB signal to control the parking braking of a vehicle.

When the main control unit 100 fails, the second control unit 132 receives the EPB signal to decide parking braking and transfers the decided parking braking command to the first rear wheel unit 120. The first rear wheel unit 120 may receive the parking braking command decided by the second control unit 132, and the first rear wheel unit 120 and the second rear wheel unit 130 may control the parking braking.

When the main control unit 100 fails, the first control unit 122 and the second control unit 132 may decide a braking value so that wheel lock is not generated when braking is required by a pedal depression force. The first rear wheel unit 120 and the second rear wheel unit 130 may assist the main braking of a vehicle by receiving the decided braking value and performing braking.

Although not illustrated in FIG. 1, a sensor unit (not shown) may receive signals from a steering angle sensor (SAS), a yaw rate sensor (YRS), and the like that sense a steering angle of a vehicle to transfer to the main control unit 100.

The sensor unit may sense at least one of the steering angle signals of a vehicle, and may use chassis CAN, body CAN, or the like.

The communication network 140 allows a braking signal to be transmitted/received between the main control unit 100, the first rear wheel unit 120 and the second rear wheel unit 130.

The communication network 140 may be an in-vehicle network (IVN) for in-vehicle communication, for example, a controller area network (CAN), a local CAN, or the like.

When an abnormality occurs in the communication network 140, the main control unit 100 may not transmit and receive braking signal information with the first rear wheel unit 120 and the second rear wheel unit 130. In this case, the main control unit 100 may receive the pedal signal and generate braking force in the hydraulic brake unit 110 to perform the main braking by braking the front wheel unit.

When an abnormality occurs in the communication network 140, the main control unit 100 may control stability maintenance of a vehicle by generating differential braking force to a plurality of front wheels located in the front wheel unit.

When an abnormality occurs in the communication network 140, the main control unit 100 may not receive the EPB signal and transfer a braking signal to the first rear wheel unit 120 and the second rear wheel unit 130.

When an abnormality occurs in the communication network 140, the second rear wheel unit 130 may receive the EPB signal and control the second rear wheel to perform parking braking.

The first battery 150 and the second battery 152 may supply power to a vehicle.

The first battery 150 may be configured to supply power to the main control unit 100 to brake the hydraulic brake unit 110.

The second battery 152 may be configured to supply power to the first rear wheel unit 120 and the second rear wheel unit 130 to brake the rear wheel unit of a vehicle.

Although the battery of a vehicle is a dual-battery setup composed of the first battery 150 and the second battery 152, the number of batteries is not necessarily limited to two.

When the first battery 150 fails, since the main control unit 100 is not supplied with power from the first battery 150, even when the pedal signal and the EPB signal are received, braking may not be performed using the hydraulic brake unit 110. The first control unit 122 may receive the pedal signal to decide a braking command, and transfer the decided braking command to the second rear wheel unit 130 to generate braking force in the first rear wheel unit 120 and the second rear wheel unit 130, thereby controlling the main braking.

When the second battery 152 fails, although the first control unit 122 and the second control unit 133 receive the pedal signal, since power is not supplied from the second battery 152, the main braking may not be performed. The main control unit 100 may receive the pedal signal and use the hydraulic brake unit 110 to generate a braking force in the front wheel unit of a vehicle, thereby performing main braking.

When the second battery 152 fails, the parking braking may not be controlled because braking force may not be generated in the first rear wheel unit 120 and the second rear wheel unit 130.

The main control unit 100 may sense whether the second battery 152 has failed, and transmit whether the second battery 152 has failed to a driver using a device such as a cluster of a vehicle.

When the second battery 152 fails, the main control unit 100 may guide a driver to park a vehicle on a flat land. Alternatively, the driver may perform parking braking using a braking device such as a parking sprag.

Figure 2:
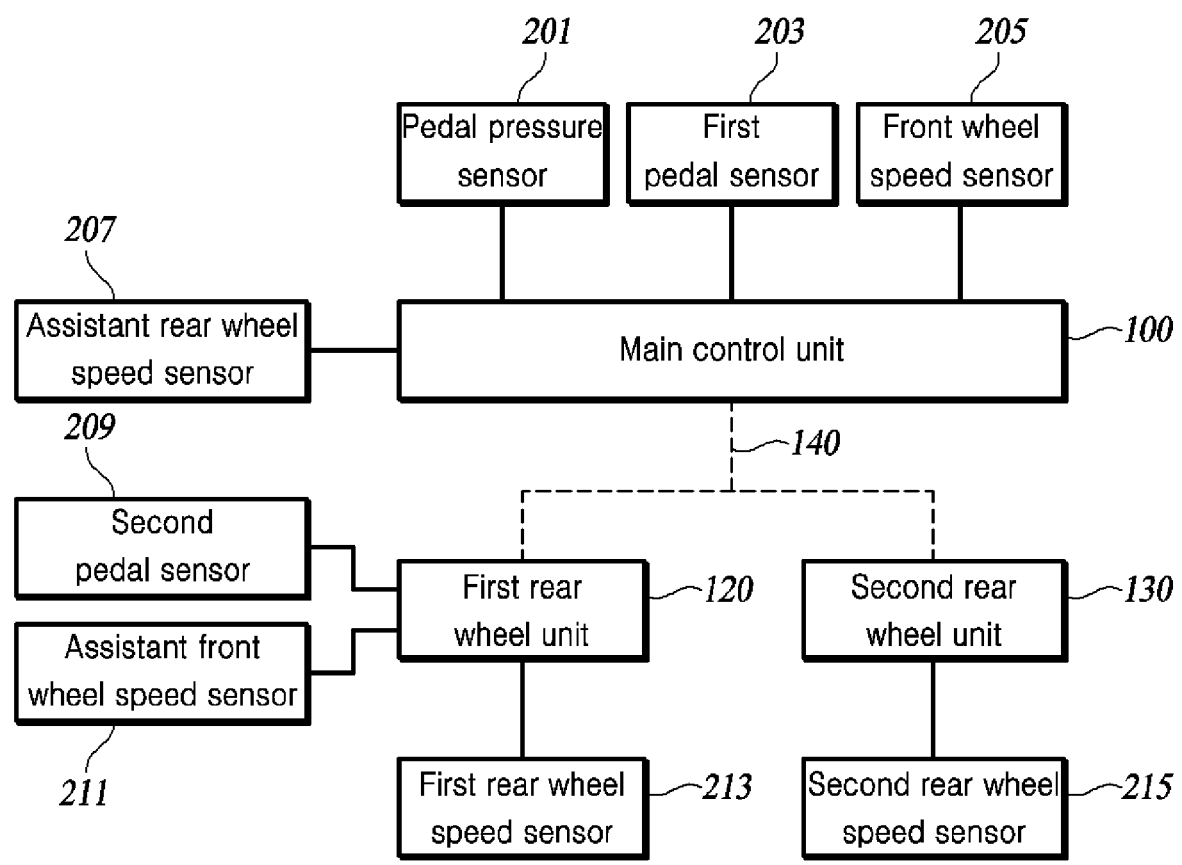
FIG. 2 is a view illustrating a sensor connection structure of a brake for a vehicle according to an embodiment of the present disclosure.

FIG. 2 is a view illustrating a sensor connection structure of a brake for a vehicle according to an embodiment of the present disclosure.

A sensor of the brake for the vehicle is configured as a main sensor for receiving a main signal and an assistant sensor for receiving an assistant signal to implement sensor redundancy.

Referring to FIG. 2, in order to implement redundancy of the main braking signal, a pedal pressure sensor 201 and a first pedal sensor 203 may be connected to the main control unit 100, and a second pedal sensor 209 may be connected to the first rear wheel unit 120.

The brake for the vehicle may include an assistant wheel speed sensor to implement redundancy of vehicle speed estimation. The assistant wheel speed sensor may be configured as an assistant rear wheel speed sensor 207 and an assistant front wheel speed sensor 211.

The assistant rear wheel speed sensor 207 may measure a wheel speed of at least one of the first rear wheel and the second rear wheel. The assistant front wheel speed sensor 211 may measure a wheel speed of at least one of a plurality of front wheels. The assistant rear wheel speed sensor 207 may be connected to the main control unit 100, and the assistant front wheel speed sensor 211 may be connected to the first rear wheel unit 120.

The main control unit 100 may be connected to the pedal pressure sensor 201, the first pedal sensor 203, a front wheel speed sensor 205, and the assistant rear wheel speed sensor 207.

The pedal pressure sensor 201 may transfer an input pedal signal to the main controller 100 when a vehicle is to be braked by a pedal depression force.

The first pedal sensor 203 may transfer the received pedal signal to the main control unit 100.

The main control unit 100 may be connected to the pedal pressure sensor 201 and the first pedal sensor 203 to receive a pedal signal and perform main braking.

When the first rear wheel unit 120 fails, the main control unit 100 may perform main braking using the pedal signals received by the pedal pressure sensor 201 and the first pedal sensor 203.

When an abnormality occurs in the communication network 140, the main control unit 100 may perform main braking using the pedal signals received by the pedal pressure sensor 201 and the first pedal sensor 203.

The main control unit 100 may be connected to the front wheel speed sensor 205 that measures a plurality of front wheel speeds.

The main control unit 100 may be connected to the assistant rear wheel speed sensor 207 that measures a wheel speed of at least one of the first rear wheel and the second rear wheel in order to implement redundancy of vehicle speed estimation.

When the assistant rear wheel speed sensor 207 is connected to the main control unit 100 to measure a wheel speed of the second rear wheel, the first rear wheel unit 120 may be connected to the assistant front wheel speed sensor 211 to receive a wheel speed of at least one of the plurality of front wheels. When the assistant rear wheel speed sensor 207 receives a wheel speed of the first rear wheel, the second rear wheel unit 120 may be connected to the assistant front wheel speed sensor 211 to receive a wheel speed of at least one of the plurality of front wheels.

When an abnormality occurs in the communication network 140, the main control unit 100 may not receive the wheel speed values of the first rear wheel and the second rear wheel from the first rear wheel unit 120 and the second rear wheel unit 130. The main control unit 100 may receive a plurality of front wheel speeds using the front wheel speed sensor 205, and receive a wheel speed of at least one of the first rear wheel and the second rear wheel using the assistant rear wheel speed sensor 207. In other words, even when an abnormality occurs in the communication network 140, the main control unit 100 may receive at least three or more wheel speeds to estimate a vehicle speed.

When the main control unit 100 is able to estimate the speed of a vehicle using two or less wheel speed sensors, the assistant rear wheel speed sensor 207 may not be included in the configuration of an embodiment of the present disclosure.

The first rear wheel unit 120 may be connected to the second pedal sensor 209, the assistant front wheel speed sensor 211, and the first rear wheel speed sensor 213.

The first rear wheel unit 120 may receive a pedal signal using the second pedal sensor 209, and the first control unit 122 may determine a main braking command using the received pedal signal.

The second pedal sensor 209 may implement redundancy for the main braking with the pedal pressure sensor 201 and the first pedal sensor 203 connected to the main control unit 100. For example, when the main control unit 100 fails, the first rear wheel unit 120 may receive a pedal signal using the second pedal sensor 209, and the first control unit 122 may independently decide the main braking based on the received pedal signal. The first rear wheel unit 120 may transfer the decided main braking to the second rear wheel unit 130 using the communication network 140. In other words, when the main control unit 100 fails, the first rear wheel unit 120 may independently decide the main braking and perform the main braking with the second rear wheel unit 130.

The first rear wheel unit 120 may be connected to the first rear wheel speed sensor 213 which measures a wheel speed of the first rear wheel. The first rear wheel unit 120 may receive a wheel speed of the first rear wheel using the first rear wheel speed sensor 213, and transmit the same to the main control unit 100 and the second rear wheel unit 130 using the communication network 140.

The first rear wheel unit 120 may be connected to the assistant front wheel speed sensor 211 which measures a wheel speed of at least one of the plurality of front wheels. The first rear wheel unit 120 may estimate a vehicle speed using a wheel speed of at least one of the front wheels, a wheel speed of the first rear wheel, and a wheel speed of the second rear wheel. In other words, even when the main control unit 100 fails, the first rear wheel unit 120 may estimate a vehicle speed using at least three or more wheel speeds.

When the first rear wheel unit 120 is able to estimate a vehicle speed using two or less wheel speed sensors, the assistant front wheel speed sensor 211 may not be included in the configuration of an embodiment of the present disclosure.

The second rear wheel unit 130 may be connected to a second rear wheel speed sensor 215 for measuring a wheel speed of the second rear wheel. The second rear wheel unit 130 may receive a wheel speed of the second rear wheel using the second rear wheel speed sensor 215, and transmit the same to the main control unit 100 and the first rear wheel unit 120.

The second rear wheel unit 130 may receive signals received by the main control unit 100 and the second rear wheel unit 120 using the communication network 140.

*The main control unit 100, the first rear wheel unit 120, and the second rear wheel unit 130 may share a signal using the communication network 140. For example, the first rear wheel unit 120 and the second rear wheel unit 130 may receive signals from the first pedal sensor 203, the front wheel speed sensor 205, and the pedal pressure sensor 201, all connected to the main control unit 100. In addition, the main control unit 100 and the second rear wheel unit 130 may receive signals from the assistant front wheel speed sensor 211, the first rear wheel speed sensor 213, and the second pedal sensor 209 all connected to the first rear wheel unit 120. The main control unit 100 and the first rear wheel unit 120 may receive a signal from the second rear wheel speed sensor 215 connected to the second rear wheel unit 130.

Figure 3:
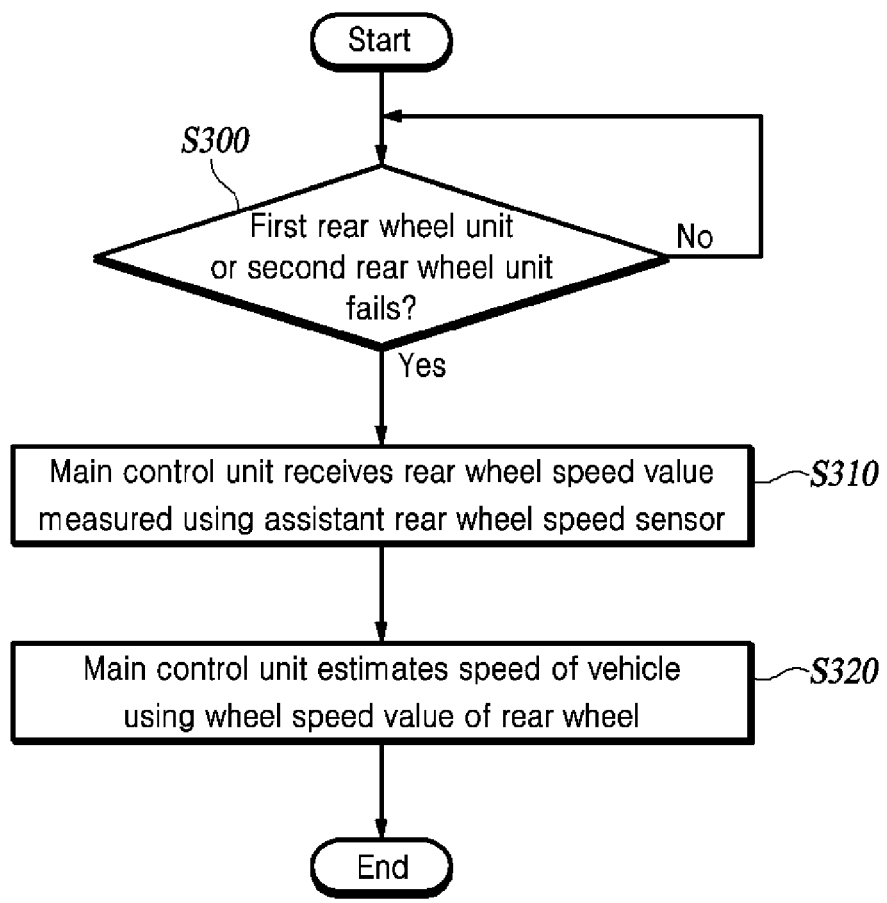
FIG. 3 is a flowchart illustrating a main control unit controlling a vehicle using an assistant wheel speed sensor when a first rear wheel unit or a second rear wheel unit of a brake for a vehicle according to an embodiment of the present disclosure fails.

FIG. 3 is a flowchart illustrating the main control unit 100 controlling a vehicle using an assistant wheel speed sensor when the first rear wheel unit 120 or the second rear wheel unit 130 of a brake for a vehicle according to an embodiment of the present disclosure fails.

Referring to FIG. 3, it is determined whether the first rear wheel unit 120 or the second rear wheel unit 130 has failed (S300). The main control unit 100 may determine whether the first rear wheel unit 120 or the second rear wheel unit 130 has failed. The first rear wheel unit 120 and the second rear wheel unit 130 may be connected to the first rear wheel speed sensor 213 and the second rear wheel speed sensor 215 for measuring the wheel speeds of the first and second rear wheels, respectively. Here, the process S300 may include a case where the communication network 140 has failed.

When it is determined that the first rear wheel unit 120 or the second rear wheel unit 130 has failed, the main control unit 100 receives the rear wheel speed value measured using the assistant rear wheel speed sensor 207 (S310). The assistant rear wheel speed sensor 207 may be connected to the main control unit 100 to measure a wheel speed of at least one of the first rear wheel and the second rear wheel. In addition, the main control unit 100 may be connected to the front wheel speed sensor 205 for measuring a wheel speed of the front wheel unit.

The main control unit 100 estimates a speed of a vehicle using a wheel speed value of the rear wheel (S320).

When the first rear wheel unit 120 or the second rear wheel unit 130 fails, the main control unit 100 may receive a wheel speed of the front wheel unit measured by the front wheel speed sensor 205. The main control unit 100 may receive a wheel speed of at least one of the first rear wheel and the second rear wheel measured by the assistant rear wheel speed sensor 207. Accordingly, the main control unit 100 may assist in braking of the ABS using at least three or more wheel speeds.

Figure 4:
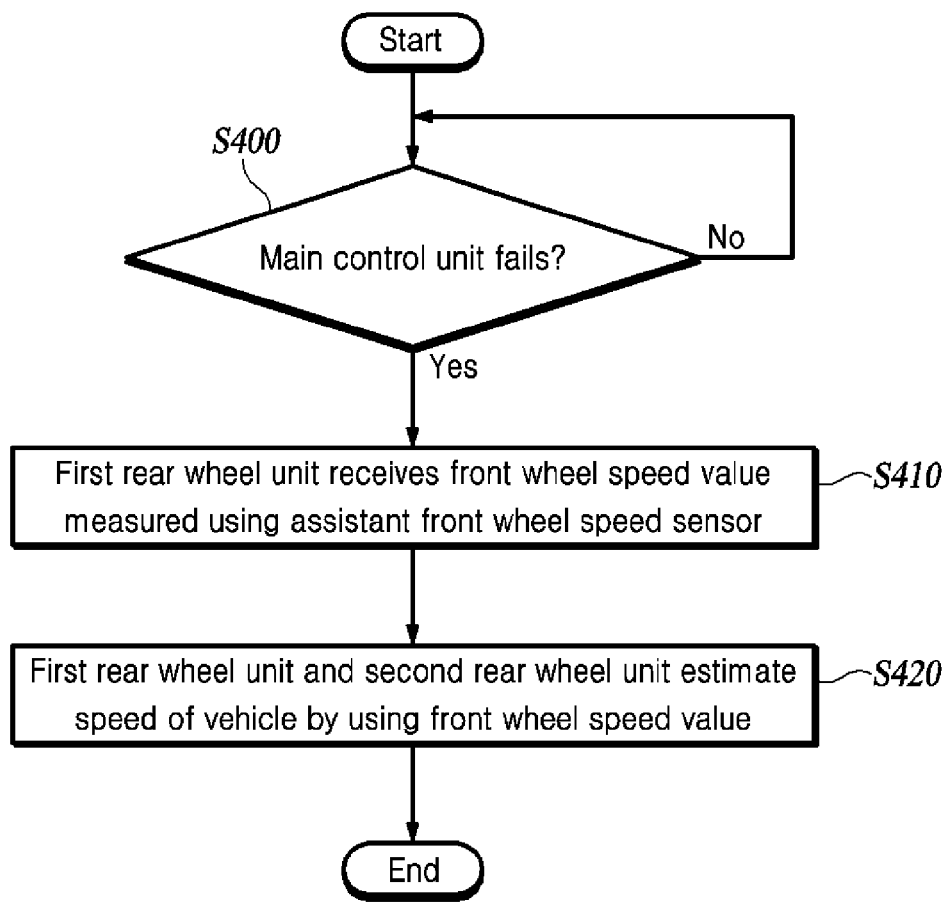
FIG. 4 is a flowchart illustrating a first rear wheel unit controlling a vehicle using an assistant wheel speed sensor when a main control unit of a brake for a vehicle according to an embodiment of the present disclosure fails.

FIG. 4 is a flowchart illustrating the first rear wheel unit 120 controlling a vehicle using an assistant wheel speed sensor when the main control unit 100 of a brake for a vehicle according to an embodiment of the present disclosure fails.

Referring to FIG. 4, it is determined whether the main control unit 100 has failed (S400). The first rear wheel unit 120 or the second rear wheel unit 130 may determine whether the main control unit 100 has failed.

When it is determined that the main control unit 100 has failed, the first rear wheel unit 120 receives a front wheel speed value measured using the assistant front wheel speed sensor 211 (S410). The first rear wheel unit 120 may receive a wheel speed of the first rear wheel and may receive a wheel speed of the second rear wheel from the second rear wheel unit 130.

The first rear wheel unit 120 and the second rear wheel unit 130 estimate the speed of a vehicle by using a front wheel speed value (S420). When the main control unit 100 fails, the first rear wheel unit 120 may receive a front wheel speed of at least one of the plurality of front wheels using the assistant front wheel speed sensor 211. The first rear wheel unit 120 may receive a wheel speed of the second rear wheel received by the second rear wheel unit 130 using the communication network 140. The second rear wheel unit 130 may receive a wheel speed of the first rear wheel received by the first rear wheel unit 120 and a wheel speed of at least one of the plurality of front wheel units using the communication network 140. In other words, the second rear wheel unit 130 may receive and control the wheel speed received by the first rear wheel unit 120. Accordingly, the first rear wheel unit 120 and the second rear wheel unit 130 may assist in braking of the ABS using at least three or more wheel speeds.

Figure 5:
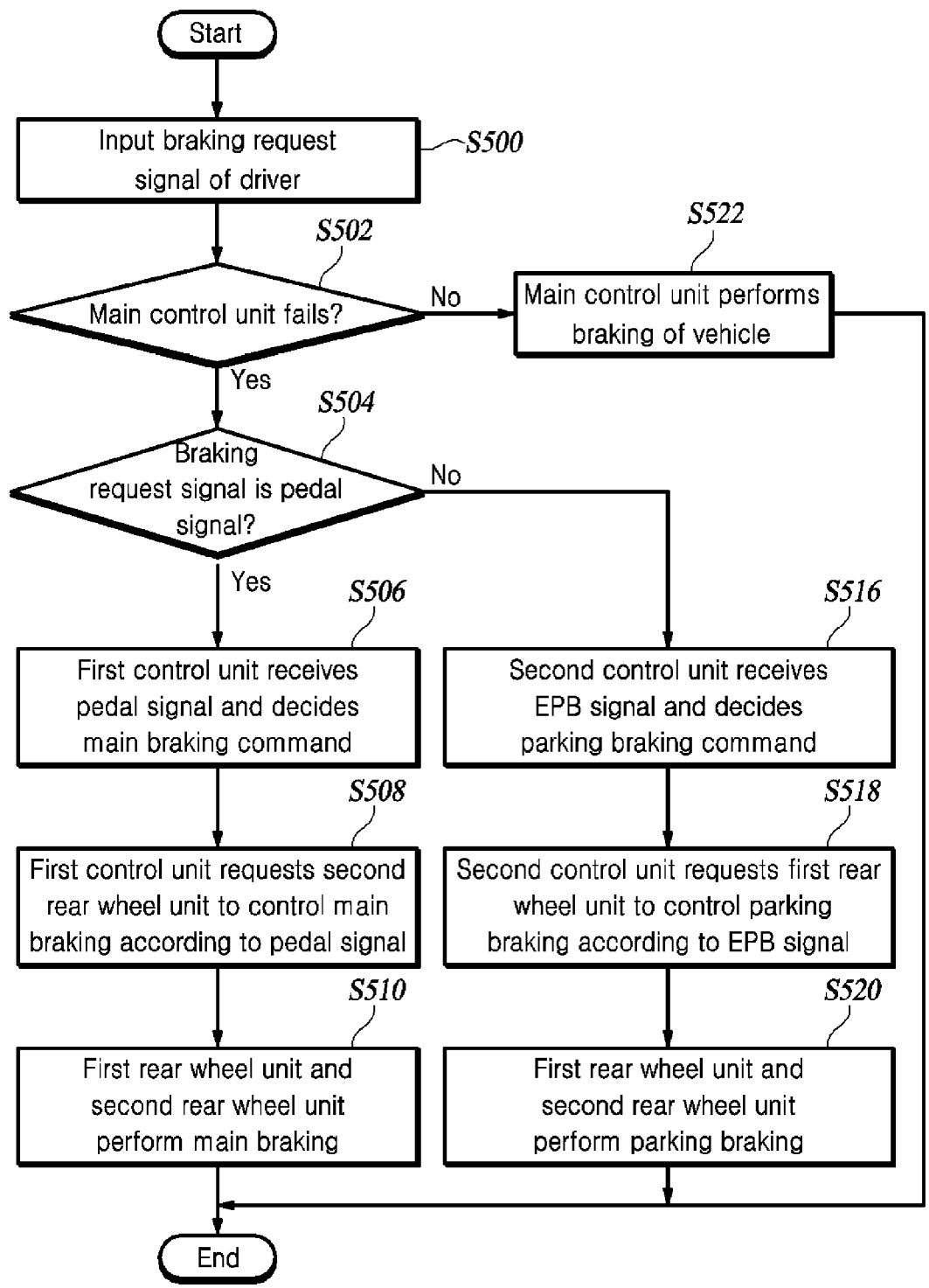
FIG. 5 is a flowchart illustrating a first rear wheel unit and a second rear wheel unit receiving a pedal signal and an EPB signal to control a vehicle when a main control unit according to an embodiment of the present disclosure fails.

FIG. 5 is a flowchart illustrating the first rear wheel unit 120 and the second rear wheel unit 130 receiving a pedal signal and an EPB signal to control a vehicle when a main control unit according to an embodiment of the present disclosure has failed.

Referring to FIG. 5, a braking request signal of a driver is received (S500). It is determined whether the main control unit 100 has failed (S502). The first control unit 122 and the second control unit 132 may determine whether the main control unit 100 has failed.

When it is determined that the main control unit 100 has failed, it is determined whether the braking request signal is a pedal signal (S504). The first control unit 122 may determine whether the received braking request signal is a pedal signal.

When it is determined that the braking request signal is a pedal signal, the first control unit 122 receives the pedal signal and decides a main braking command (S506). The first control unit 122 may receive the pedal signal to generate braking force on the first rear wheel. Here, by using a pedal pressure sensor connected to the main control unit 100, the main braking may be performed using a signal applied to the pedal.

The first control unit 122 requests the second rear wheel unit 130 to control the main braking according to the pedal signal (S508). The first control unit 122 may transfer a braking command based on the pedal signal to the second rear wheel unit 130 using the communication network 140. The second rear wheel unit 130 receiving the braking command from the first control unit 122 may generate braking force based on the main braking.

The first rear wheel unit 120 and the second rear wheel unit 130 perform the main braking of a vehicle (S510).

The first control unit 122 may receive the pedal signal, perform main braking using the first rear wheel unit 120, and transfer a braking command based on the pedal signal to the second rear wheel unit 130 to perform the main braking.

In process S504, when it is determined that the braking request signal is not a pedal signal but is an EPB signal, as an example, the second control unit 132 receives the EPB signal and decides a parking braking command (S516). The second control unit 132 may determine whether the received braking request signal is an EPB signal, and may generate braking force to the second rear wheel based on the EPB signal.

The second control unit 132 requests the first rear wheel unit 120 to control the parking braking according to the EPB signal (S518). The second control unit 132 may transfer a braking command based on the EPB signal to the first rear wheel unit 120 using the communication network 140. The first rear wheel unit 120 receiving the braking command from the second control unit 132 may generate braking force based on parking braking.

The first rear wheel unit 120 and the second rear wheel unit 130 perform parking braking of a vehicle (S520).

The second control unit 132 receives the EPB signal, performs parking braking using the second rear wheel unit 130, and transfers a braking command based on the EPB signal to the first rear wheel unit 120 to perform the parking braking.

In process S502, when it is determined that the main control unit 100 has not failed, the main control unit 100 performs main braking and parking braking according to the braking request signal of a driver (S522).

According to the brake for the vehicle and control method according to an embodiment of the present disclosure, by removing the redundancy ECU from a hybrid EMB system and allowing the first control unit 122 and the second control unit 132, which are wheel control units, to perform the functions of the redundancy ECU, the configuration of a brake is simplified and the cost of manufacturing is reduced, thereby securing price competitiveness.

In addition, there is a benefit of securing the redundancy of vehicle speed estimation through an assistant wheel speed sensor including the assistant front wheel speed sensor 211 and the assistant rear wheel speed sensor 207.

According to an embodiment of the present disclosure, a plurality of rear wheel EMB wheel control units perform functions of a redundancy ECU, thereby simplifying an EMB system configuration and reducing manufacturing costs.

According to an embodiment of the present disclosure, a redundancy system for estimating a vehicle speed may be implemented during Anti-lock Braking System (ABS) control by connecting an assistant wheel speed sensor measuring wheel speeds of front wheels and rear wheels to a main control unit and a first rear wheel unit.

Each component of the device or method according to an embodiment of the present disclosure may be implemented by hardware, software, or a combination of hardware and software. In addition, the function of each component may be implemented by software and the microprocessor may be implemented to execute the function of software corresponding to each component.

Various implementations of the systems and techniques described herein may be implemented by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable recording medium."

The computer-readable recording medium includes all types of recording devices in which data readable by a computer system is stored. These computer-readable recording media may include non-volatile or non-transitory media, such as ROM, CD-ROM, magnetic tape, floppy disk, memory card, hard disk, magneto-optical disk, storage device, etc., and may further include transitory media, such as data transmission medium. In addition, the computer-readable recording medium may be distributed in network-connected computer systems, and the computer-readable code may be stored and executed in a distributed manner.

Although it is described that each process is sequentially executed in the flowchart/timing diagram of the present specification, this is merely illustrative of the technical idea of an embodiment of the present disclosure. In other words, one of ordinary skill in the art to which an embodiment of the present disclosure pertains will be able to change and execute the order described in the flowchart and timing diagram without departing from the essential characteristics of an embodiment of the present disclosure, and apply various modifications and variations to executing one or more of each process in parallel. Accordingly, the flowchart/timing diagram is not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof

What is claimed is:

1. A brake system for a vehicle, comprising:
a main control unit configured to perform main braking control in response to a pedal signal, perform parking braking control in response to an electronic parking brake (EPB) signal, and control a plurality of hydraulic brake units disposed at a front wheel unit of the vehicle;
a first rear wheel unit including a first control unit configured to receive the pedal signal and control a first rear wheel;
a second rear wheel unit including a second control unit configured to receive the EPB signal and control a second rear wheel; and
a communication network configured to transmit a braking signal among the main control unit, the first rear wheel unit and the second rear wheel unit.

2. The brake system of claim 1, wherein the first control unit is configured to perform, in response to a failure at the main control unit, the main braking control based on the pedal signal, and the second control unit is configured to perform the parking braking control based on the EPB signal.

3. The brake system of claim 1, wherein, in response to a failure at the first control unit, the main control unit is configured to:
perform, using the hydraulic brake unit and the second rear wheel unit, the main braking control; and perform, using the second rear wheel unit, the parking braking control.

4. The brake system of claim 1, wherein, in response to a failure at the second control unit, the main control unit is configured to:
perform, using the hydraulic brake unit and the first rear wheel unit, the main braking control; and
perform, using the first rear wheel unit, the parking braking control.

5. The brake system of claim 1, further comprising an assistant wheel speed sensor configured to measure a wheel speed of at least one of a front wheel, first rear wheel and second rear wheel of the vehicle.

6. The brake system of claim 5, wherein the assistant wheel speed sensor comprises:
an assistant rear wheel speed sensor connected to the main control unit; and
an assistant front wheel speed sensor connected to the first rear wheel unit.

7. The brake system of claim 6, wherein:
the assistant rear wheel speed sensor is configured to measure the wheel speed of at least one of the first and second rear wheels, and
the assistant front wheel speed sensor is configured to measure the wheel speed of the front wheel.

8. The brake system of claim 7, wherein the main control unit is configured, in response to a failure at the first and second rear wheel units, to estimate, using the assistant rear wheel speed sensor, a speed of the vehicle.

9. The brake system of claim 7, wherein the first rear wheel unit is configured, in response to a failure at the main control unit, to estimate, using the assistant front wheel speed sensor, a speed of the vehicle.

10. The brake system of claim 1, wherein the main control unit and first rear wheel unit are configured, in response to a failure at the communication network, to receive the pedal signal and perform the main braking control based on the received pedal signal.

11. The brake system of claim 1, wherein the second rear wheel unit is configured, in response to a failure at the communication network, to receive the EPB signal and perform the parking braking control based on the received EPB signal.

12. The brake system of claim 1, wherein the main control unit is configured to be powered by a first battery, and the first and second rear wheel units are configured to be powered by a second battery.

13. The brake system of claim 12, wherein, in response to a failure at the first battery, the first control unit is configured to receive the pedal signal, the second control unit is configured to receive the EPB signal, and the first and second rear wheel units respectively perform the main braking control and the parking braking control.

14. The brake system of claim 12, wherein the main control unit is configured to perform, in response to a failure at the second battery, the main braking control using the hydraulic brake unit.

15. A method of controlling a brake system for a vehicle having first and second rear wheel units respectively configured to control first and second rear wheels of the vehicle, the method comprising:
receiving a braking request signal;
determining whether a main control unit has failed;
in response to determining that the main control unit has failed, determining whether the braking request signal is a pedal signal or an electronic parking brake (EPB);

in response to determining that the braking request signal is the pedal signal, performing:
- generating a main braking command based on the pedal signal;
- controlling a second rear wheel unit to perform main braking control based on the pedal signal; and
- controlling the first and second rear wheel units to perform the main braking control; and in response to determining that the braking request signal is the EPB signal, performing:
- generating a parking braking command based on the received EPB signal;
- controlling the first rear wheel unit to perform parking braking control based on the EPB signal; and
- controlling the first and second rear wheel units to perform the parking braking control.

16. The method of claim 15, further comprising, in response to determining that the main control unit has not failed, controlling the main control unit to perform the main braking control and the parking braking control based on the pedal signal and the EPB signal.

\* \* \* \* \*